Patented Apr. 30, 1935

1,999,181

UNITED STATES PATENT OFFICE 1,999,181

MANUFACTURE OF CARBOXYLIC ACID KETONES AND DERIVATIVES THEREOF

Courtney Conover, St. Louis, Franklin D. Smith, Kirkwood, and Carl V. Benz, St. Louis, Mo., assignors, by mesne assignments, to Monsanto Chemical Company, a corporation of Delaware No Drawing. Application November 19, 1932, Serial No. 643,534

12 Claims. (Cl. 260—64)

This invention relates to the decarboxylation of dicarboxylic acid anhydrides according to which carbon dioxide is eliminated and a ketone or lactone group is formed. In accordance therewith phthalic anhydride is caused to react, preferably in the presence of a catalyst, whereby carbon dioxide is eliminated and the lactone of 2.2' dicarboxyl-benzophenone is obtained.

It has been proposed heretofore to form monocarboxylic acids from dicarboxylic acids by the elimination of carbon dioxide in the presence of water. Thus, for example, phthalic anhydride may be reacted with steam in the presence of a catalyst whereby benzoic acid and carbon dioxide are formed.

The present process employs the same types of catalyst, namely, decarboxylating catalyst, but is characterized by the absence of water or steam.

The object of the invention is to provide a method of manufacturing dicarboxylic acid ketones or the lactones thereof from dicarboxylic acid anhydrides. The reaction may be represented structurally as follows:

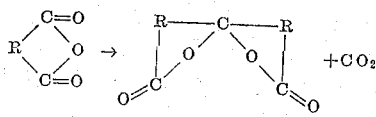

The acid is formed by the hydrolysis of the lactone; this reaction may be represented:

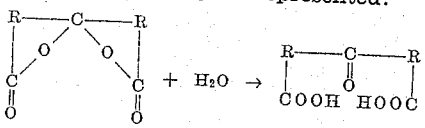

In the case of phthalic anhydride it may be represented:

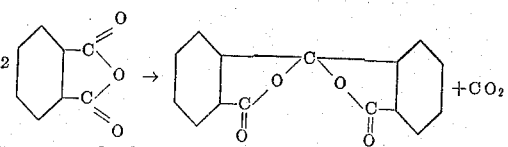

In general the reaction is effected by causing the anhydride, either in liquid or vapor form, to contact with a decarboxylating catalyst, thus the reaction is analogous to the methods of manufacturing mono-carboxylic acids from dicarboxylic acids which are prepared in an analogous manner, differing only in that water enters into the reaction. The latter reaction may be represented as follows:

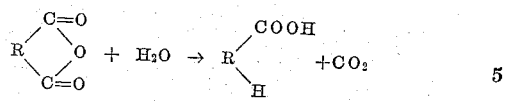

A variety of catalytic compositions may be employed to effect decarboxylation as is recognized by those skilled in the art. In general the catalytic compositions include compounds of metals of the sixth group of the periodic system, notably chromium, as well as a variety of others including zinc, aluminum, copper, nickel, silver, sodium, etc. The oxides, hydroxides and carbonates and such other compounds of the metals which are capable of combining with the dicarboxylic acid to form salts thereof, as well as the metal salts of the dicarboxylic acids, have been found to be particularly useful. We have also found that a catalytic composition containing a plurality of metal compounds is in general more active than a single metal compound. Thus, for example, a catalyst containing a compound of chromium and copper is more effective than a catalyst containing only chromium or copper. Inasmuch as water induces monocarboxylic acid formation the catalyst should be in as dry condition as is otherwise practical.

An example of the application of the principles of the invention follows: One thousand parts by weight of phthalic anhydride and fifty parts by weight of a decarboxylating catalyst are maintained at a temperature of 180°–190° C. for 25–30 hours. By raising the reaction temperature the rate of reaction is accelerated. The mixture may be agitated advantageously to facilitate the evolution of carbon dioxide and assure a uniform reaction mixture.

A catalyst which may be employed with good results consists of one molar proportion of copper oxide or hydroxide, three molar proportions of chromium oxide or hydroxide, preferably in a finely divided form, to facilitate the inter-action with the dicarboxylic acid anhydride. To the mixture of dry copper and chromium oxides or hydroxides there is added three molar proportions of anhydrous sodium carbonate. The resulting mixture is ready for use as described in the foregoing paragraph.

At the end of the reaction period the mixture assumes a viscuous consistency which tends to foam or froth. The temperature is then allowed to drop and the reaction product is dissolved in an aqueous lye solution, filtered to remove the insoluble matter, and the acid product 2,2 dicarboxylic benzophenone, together with some phthalic acid formed from the unreacted phthalic anhydride, is liberated and precipitated by the addition of muriatic acid. The crude product so obtained may be refined further by dissolving it in a clean cut of petroleum naphtha (having a boiling point of 150°–170° C.) near the boiling point thereof. The resulting solution is filtered to separate the phthalic acid and the filtrate permitted to cool, whereupon the lactone separates in crystalline form.

Another procedure for isolating the product consists in dissolving the reaction mixture in an aqueous lye solution, using but a slight excess of the alkali. A small amount of calcium chloride is dissolved in the resulting aqueous mixture which facilitates the separation of the color imparting impurities. Thereafter the solution is filtered and the filtrate is acidified with muriatic acid whereby the organic acids are precipitated; these are separated from the mother liquor, washed with water, dried, and finally treated with a petroleum solvent as in the previous example, to form and separate the lactone from the phthalic acid.

The product so obtained melts at 208.5°–210° C., forms high boiling esters of alcohols such as the dimethyl ester, diethyl ester, etc., and is identical in other respects to the product described in the literature having the same constitution but made by other methods. The esters are suitable solvents and plasticizers for cellulose esters and ethers, as well as synthetic resins and other varnish bases when used in a manner analagous to other high boiling esters of polycarboxylic acids. The acid product may be employed in the manufacture of resins of the alkyd type, as a partial or total substitute for the phthalic acid or anhydride now commonly employed. In lieu of the phthalic anhydride employed in the foregoing example one may substitute succinic anhydride, substituted phthalic anhydride such as chlor phthalic anhydride, as well as other dicarboxylic acid anhydrides to produce corresponding ketones or lactones of dicarboxylic acids.

The temperatures of the reaction may be varied according to the desired rate of reaction and the activity of the particular catalyst employed, as well at the nature of the anhydride which is employed. Although we prefer to conduct the reaction while maintaining the anhydride in a molten or liquid state as described in the foregoing example, the invention is not so limited but contemplates as well contacting vapors of the anhydride with or without a diluent inert vapor with a catalytic composition. In the latter case, however, higher temperatures are in general required as has been the experience in the manufacture of mono-carboxylic acid by the decarboxylation of dicarboxylic acids with steam.

From the foregoing description it will be evident that the present invention affords a novel method of forming acid ketonic or lactone compositions, which is characterized by the fact that acid anhydrides of dicarboxylic acids are subjected to decarboxylation while maintaining a substantially anhydrous condition.

Obviously, other solvents may be employed in the recovery of the product. Moreover, other methods of purification may be employed; similarly, catalyst compositions containing but a single metallic element or a combination of several elements other than those specifically described in the foregoing may be employed without departing from the spirit of this invention.

What we claim is:

1. The method which consists in decarboxylating a dicarboxylic acid anhydride characterized in that the anhydride is heated to reaction temperature in the presence of a decarboxylating catalyst and substantial absence of water.

2. The method which is defined in claim 1 and further characterized in that the catalyst includes as a major component a compound of chromium.

3. The method as defined in claim 1 and further characterized in that the catalyst contains as a major component a compound of chromium and the reaction is effected in a liquid phase.

4. The method as defined in claim 1 and further characterized in that the catalyst contains as a major component a compound of at least one of the following elements: copper, chromium, silver, nickel, aluminum, zinc and sodium.

5. The method as defined in claim 1 and further characterized in that the catalyst contains as a major component a compound of at least one of the following elements: copper, chromium, nickel, silver, aluminum, zinc and sodium, and the reaction is effected in a liquid phase.

6. The method as defined in claim 1 and further characterized in that the decarboxylating catalyst is in the form of a metallic salt of the dicarboxylic acid anhydride being decarboxylated or a material capable of forming such salt under the reaction conditions.

7. The method which consists in heating to reaction temperature a dicarboxylic acid anhydride in which the carboxyl groups are joined to adjacent carbon atoms to react while in a molten state in the presence of a decarboxylating catalyst and substantial absence of water.

8. The method which consists in heating to reaction temperature an aromatic dicarboxylic acid anhydride to react while in a molten state in the presence of a decarboxylating catalyst and substantial absence of water.

9. The method which consists in heating to reaction temperature phthalic anhydride to react in the presence of a decarboxylating catalyst and substantial absence of water.

10. The method which consists in heating to reaction temperature phthalic anhydride and a decarboxylating catalyst which contains as a major component a compound of at least one of the following elements: zinc, aluminum, silver, copper, chromium, nickel and sodium, said method being further characterized in that the reaction is effected while maintaining the phthalic anhydride in liquid phase and in the absence of steam or water.

11. The method as defined in claim 10 and further characterized in that the compounds serving as catalysts are salts of phthalic acid or substances capable of forming salts of phthalic acid under the reaction conditions.

12. The method of condensing two mols. of a dicarboxylic anhydride to form the corresponding dicarboxylic ketone which comprises heating the anhydride to reaction temperature in the presence of a decarboxylating catalyst and in the absence of water or steam.

COURTNEY CONOVER.
FRANKLIN D. SMITH.
CARL V. BENZ.